Jan. 2, 1951 E. R. PRICE 2,536,461
BOOSTER DEVICE FOR FLUID PRESSURE SYSTEMS
Filed March 5, 1945
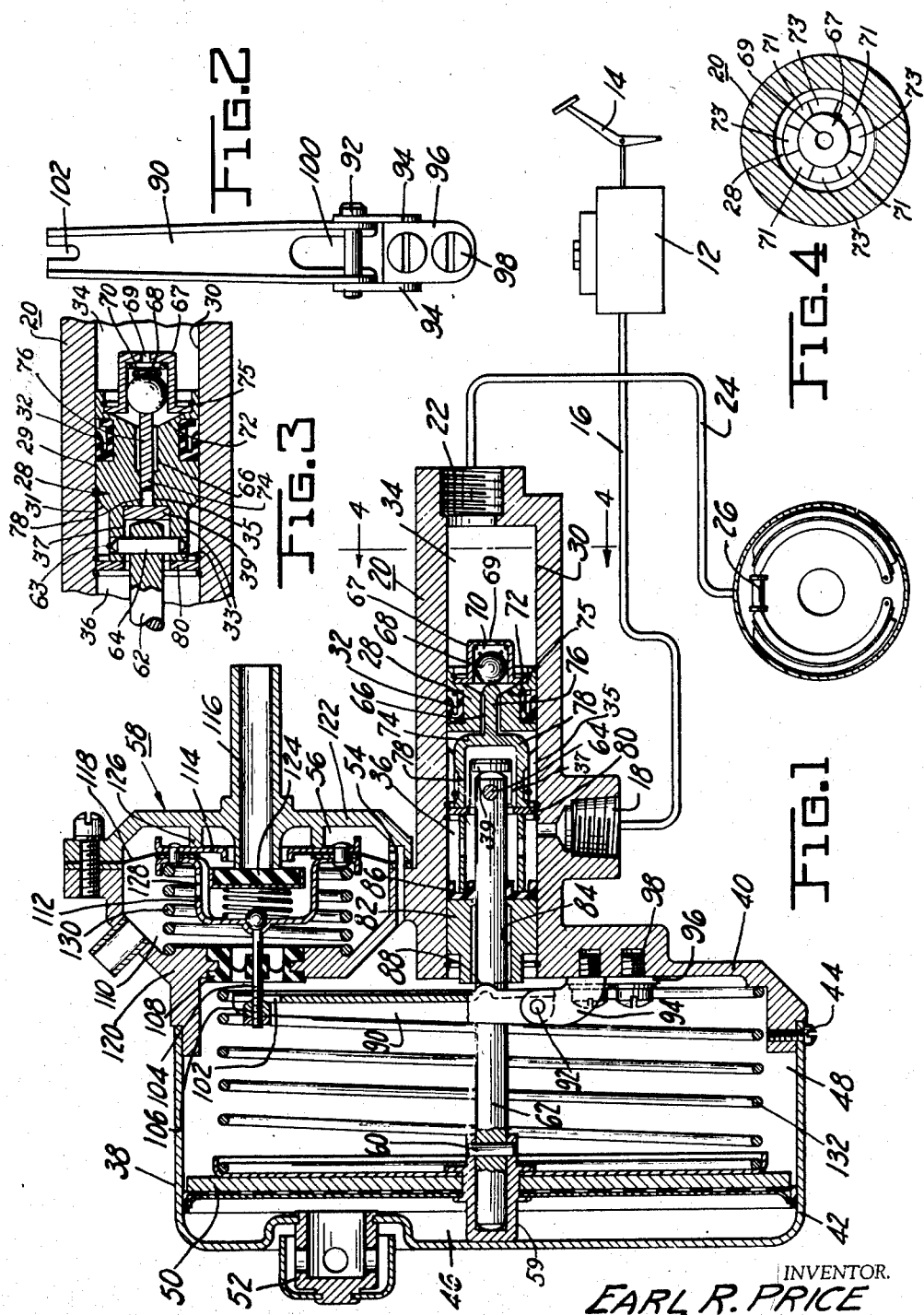
INVENTOR.
EARL R. PRICE
BY T. J. Plante
ATTORNEY Patented Jan. 2, 1951

2,536,461

UNITED STATES PATENT OFFICE 2,536,461

BOOSTER DEVICE FOR FLUID PRESSURE SYSTEM

Earl R. Price, South Bend, Ind., assignor to Bendix Aviation Corporation, South Bend, Ind., a corporation of Delaware Application March 5, 1945, Serial No. 581,117

4 Claims. (Cl. 60—54.5)

This invention relates to booster devices for hydraulic pressure systems, particularly hydraulic brake systems wherein the usual operator operated master cylinder and wheel cylinders or motors are provided. In such systems, the power device which provides the booster effect is usually under the control of valve mechanism, which in turn is under the control of the hydraulic pressure in the operator operated master cylinder. Heretofore this has necessitated providing, in addition to the bore for the hydraulic piston in the auxiliary master cylinder which is associated with the power device, a second bore in which reciprocates the piston which operates the valve mechanism.

An object of the present invention is to simplify and make less expensive a booster device of this type, particularly by locating the piston which controls the valve mechanism in the same bore as the piston which develops the wheel cylinder pressure. With this arrangement, the former valve pistol seal is eliminated, since the seal heretofore located at the closed end of the auxiliary master cylinder serves as the seal for the present valve piston.

More specifically, the present invention provides a valve controlling piston located in the auxiliary master cylinder acting against a laterally offset reaction member, such as the usual diaphragm, through the medium of a lever which proportions the effort of the piston and the reaction member in such a manner as to obtain the desired ratio between the power developed and the manual force exerted.

A further object of the present invention is to improve and simplify the construction of the piston in the auxiliary master cylinder.

Other objects and attainments of the present invention will become apparent during the following description.

In the accompanying drawing:

Figure 1 is a section taken through a booster unit embodying my invention, the operator operated master cylinder and the wheel cylinder being shown diagrammatically;

Figure 2 is an end view of the lever arrangement of Figure 1;

Figure 3 is a longitudinal-section of the hydraulic piston of Figure 1, taken at right angles to the sectional view of Figure 1; and Figure 4 is a section taken on the line 4—4 of Figure 1, showing an end view of the hydraulic piston.

Referring to the drawing, a conventional master cylinder 12 operated by a pedal 14 may be connected by means of a line 16 to inlet port 18 of auxiliary master cylinder 20. An outlet port 22 of cylinder 20 is connected by means of line 24 to one or more conventional motors or wheel cylinders 26.

A piston 28 is reciprocable within the bore 30 of cylinder 20, the usual seal 32 being provided to prevent inopportune passage of fluid between chamber 34 ahead of the piston and chamber 36 at the rear of the piston. The cylinder 20 is located at the front of and preferably concentric with a power device or power cylinder 38. A convenient construction of the hydraulic cylinder 20 and power cylinder 38 is shown, wherein the forward end 40 of power cylinder 38 is formed as an integral part of the same casting which provides hydraulic cylinder 20. The side and rear walls of power cylinder 38 may be constituted by a drawn member 42 which is secured to the cast front portion 40 by means of a plurality of screws 44. The interior of power cylinder 38 is divided into two chambers 46 and 48 by means of a piston or pressure responsive movable member 50, the particular construction and arrangement of which is not material to the present invention. Preferably chamber 46 is constantly in communication with air at atmospheric pressure through a ported fitting 52, and chamber 48 is connected by means of passage 54 with control chamber 56 of a control valve generally indicated at 58. The structure and operation of valve 58 will be more fully discussed hereinafter.

Although chamber 48 of the power cylinder, as well as chamber 46, is normally maintained at atmospheric pressure, the arrangement is such that chamber 48 can be evacuated to develop a pressure differential over piston 50, which will thereupon transmit pressure through the end wall of sleeve 59 and pressure transmitting rod 62 to piston 28 in hydraulic cylinder 20, tending to move said piston 28 toward the right to develop a pressure in chamber 34 and motor 26. A cross-pin 60 connects sleeve 59 to rod 62, in order to provide a positive means for returning the rod to released position.

The structure of piston 28 is shown more clearly in Figure 3. The piston comprises a forward full-diameter portion 29, a tapering portion 31, and a rearwardly extending small-diameter portion 33. A transverse slot 35 is provided in the rear portion of the piston, and a cylindrical opening 37 in the back of the piston receives the forward end of rod 62. Pressure is transmitted from rod 62 to piston 28 primarily through a thrust washer 39, located in the bottom of the opening 37. A cross-pin 64 extends through openings in the forward end of rod 62 and in the rear portion 33 of piston 28, in order to provide a positive connection for retracting the piston 28 when the power piston is retracted. The pin 64 is retained in position by a snap-washer 63 (see Fig. 3).

In the released position of the mechanism shown in the drawing, communication between chambers 36 and 34 of cylinder 20 is permitted by a passage 66 through piston 28. A retainer or cap 67, which is carried by the forward end of piston 28, is provided with an orifice 69 which permits liquid to flow into chamber 34; passage of liquid into chamber 34 is also permitted by the several slots 71, shown in Figure 4. As seen in Figure 4, the cap 67 is held in position by means of a plurality of spaced radially extending arms 72, which extend under a retaining washer 75 (see Figures 1 and 3). Although a ball valve element 68 is urged by a spring 70 to seat at 72 and thereby cut off the flow of liquid through passage 66, a floating member 74 has a forwardly extending portion 76 which holds the ball away from its seat as long as piston 28 remains in retracted position, the member 74 having rearwardly extending forks 78 which rest against a washer 80 mounted in fixed position inside the cylinder bore. The rear edge of piston 28 also rests against washer 80 in released position (see Figure 3).

As soon as rod 62 is moved forwardly by power cylinder piston 50, piston 28 is moved away from washer 80, allowing a slight rearward movement of floating member 74 relative to piston 28 and thereby permitting valve 68 to close passage 66, and prevent, during the brake application, further flow of liquid from chamber 34 to chamber 36. The pressure developed by the operator in master cylinder 12 is communicated to chamber 36 and therefore exerts a pressure against the rear of piston 28 which assists the power cylinder in developing brake applying pressure in motor 26.

In devices of this kind, control of the operation of the power cylinder is accomplished by the pressure fluid of the master cylinder 12. Heretofore a separate piston operating in a separate bore and connected to the master cylinder has been used for the purpose of controlling the valve mechanism 58, which in turn controls the operation of power cylinder 38. In the present arrangement a secondary piston 82 is provided in the bore 30 of cylinder 20 for the purpose of controlling valve 58. The piston 82 has an opening 84 through the center thereof to accommodate rod 62, and is provided with the usual seal 86 to prevent escape of fluid from chamber 36 past piston 82. It will be apparent that the pressure developed in master cylinder 12 and acting in chamber 36 will act against piston 82 tending to move it toward the left or toward the rear of cylinder 20.

The rear of piston 82 is in contact with portion 88 of a lever 90 which is located inside the casing of power cylinder 38 and which is pivotally mounted by means of a pin 92 on arms 94 of a bracket 96 secured to the inside front wall of the power cylinder by means of fastenings 98. The lever 90 may be channel-shaped in section, as shown, a slot 100 in the bottom of the channel extending upwardly from the lower end of the lever beyond rod 62, and a second slot 102 extending downwardly from the upper end of the lever to receive a rod 104, the left end of which is threaded in order that the connection between rod 104 and lever 90 can be adjusted to compensate for manufacturing tolerances by means of a nut and lock-nut combination 106. Rod 104 extends through a seal 108 into chamber 110 of valve 58, where it is connected to a ported cage member 112 which is secured to a plate 114 providing a valve seat. Chamber 110 of the valve is constantly open to air at atmospheric pressure, and port 116 of the valve is connected to a source of vacuum, such as the conventional intake manifold.

The forces acting on lever 90 are provided by piston 82 acting in one direction and by a reaction member acting in the opposite direction to exert a force proportional to the force developed in the power cylinder against the force exerted by the operator, thereby giving the operator a sense of "feel" from which he can gauge the extent of brake application. This reaction is preferably provided by a diaphragm reaction member 118 laterally offset from the hydraulic cylinder 20 and mounted between that portion 120 of valve 58 which is formed integral with cylinder 20 and the front end of the power cylinder 38, and a casting 122 which completes the valve enclosure. The diaphragm 118 in the illustrated device is annular in shape and has its inner edge secured between cage 112 and plate 114, the open center of the reaction member being closed during brake application by valve member 124 which is at that time seated against plate 114. The amount of pressure differential developed over reaction diaphragm 118 is the same as that developed over power piston 50, so that the reaction force is proportional to the force developed by the power cylinder, the ratio depending upon the relative areas of the reaction member 118 and piston 50, and upon the leverage relationship provided by lever 90 between reaction member 118 and piston 82. Because lever 90 is so arranged as to give a substantial leverage advantage to reaction member 118 over piston 82, the area of reaction member 118 may be relatively small, thereby reducing the overall size of the booster unit.

Although the operation of the illustrated arrangement is doubtless apparent from the foregoing description, a brief summary is believed to be in order. When the operator wishes to apply the brakes he, in the usual manner, develops a pressure in master cylinder 12 which is transmitted through conduit 16, chamber 36, passage 66, chamber 34 and conduit 24 to the motor 26, and at the same time, the pressure developed in master cylinder 12, acting against piston 82, urges lever 90 in a counterclockwise direction to draw rod 104 toward the left, lifting plate 114 from its resting place against the prongs 126. As soon as plate 114 contacts valve member 124 communication of air at atmospheric pressure from chamber 110 through ports 128 and chamber 56 to chamber 48 of the power cylinder is cut off. Further movement of plate 114 lifts valve member 124 from its seat at the end of vacuum port 116, thereby beginning the evacuation of air from chamber 48 of the power cylinder. A pressure differential over piston 50 is thus developed which moves piston 28 forward in cylinder 20. Thereupon valve 68 closes passage 66 and chamber 34 is sealed from chamber 36. Pressure is now developed in motor 26 according to the combined efforts of the operator and of the power cylinder. Since chamber 110 of valve 58 and chamber 46 of the power cylinder are both connected to air at atmospheric pressure, and since chamber 56 of the valve and chamber 48 of the power cylinder are interconnected, the pressure differential developed over the reaction member 118 is the same as that developed over piston 50, and the force developed over reaction member 118 which is proportional to that developed by the power piston, acts toward the right as viewed in Figure 1, or in other words in a direction tending to move lever 90 clockwise and therefore against the pressure exerted on the lever by piston 82. Whenever the force of reaction member 118 acting through its lever arm balances the force of piston 82 acting through its lever arm, the valve will move to lapped position and thereby prevent further increase of the power cylinder effort. The valve is in lapped position when the reaction pressure on member 118 is sufficient to cause valve member 124 to cut off port 116, although plate 114 remains in contact with valve member 124 and thus prevents release of the pressure in the power cylinder.

When the pressure of the operator on master cylinder 12 is released, this permits piston 82 to be forced to the right by the pressure acting on reaction member 118, and plate 114 is caused to move away from valve member 124 by the valve return spring 130. Chamber 48 of the power cylinder is thus connected to air at atmospheric pressure, and return spring 132 in the power cylinder returns both power cylinder 50 and piston 28 in hydraulic cylinder 20 to released position. Communication is re-established between chambers 34 and 36, and the parts are therefore in their original positions, as shown in the drawing.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A booster unit for a hydraulic brake system comprising a power cylinder having a casing and a pressure responsive member movable therein under the influence of a differential air pressure, a hydraulic cylinder located in front of the power cylinder and having an inlet port near its rear end adapted to be connected to an operator operated master cylinder and an outlet port at its forward end adapted to be connected to a hydraulic motor, a piston located between said inlet and outlet ports and reciprocable in said hydraulic cylinder, said piston having a passage therethrough normally permitting communication between the master cylinder and motor, a pressure transmitting rod connected to the pressure responsive member in the power cylinder and arranged to exert pressure on the piston in the hydraulic cylinder after closing the passage therein, a second piston in said hydraulic cylinder located at the rear thereof and on the opposite side of the inlet port from the first piston, the pressure of liquid entering said inlet port acting against the first piston tending to move it forwardly and against the second piston tending to move it rearwardly, said second piston having the same outer diameter as the first piston and having an opening therethrough to accommodate the pressure transmitting rod, sealing means for preventing the escape of liquid past said second piston, a lever pivotally mounted on the inside of the power cylinder casing and pivotally contacting the rear of said second piston, valve means located at the front of said power cylinder but offset laterally from the hydraulic cylinder, said valve means being arranged to control operation of said power cylinder, a connection between said lever and said valve means which enables said lever to operate said valve means and which is adjustable to vary the distance between the valve means and the part of the lever which operates the valve means, and a reaction diaphragm associated with said valve means and connected to said lever to exert a force on said lever proportional to the force developed in the power cylinder, said lever being urged in one direction by the second piston in the hydraulic cylinder and in the opposite direction by said reaction diaphragm.

2. In a booster unit for a hydraulic pressure system including a power cylinder and a hydraulic cylinder associated therewith, a piston reciprocable in said hydraulic cylinder having a longitudinal passage therethrough and a frusto-conical valve seat provided at the forward end of said passage, a ball check valve disposed at the front of the piston and arranged to seat on the confluence of said passage and said frusto-conical valve seat to control said passage, a retainer cap surrounding said ball check valve having an opening in the end wall thereof, a compression spring confined between the end wall of said cap and said ball check valve to urge said ball check valve towards its seat, a pressure transmitting rod concentric with the piston and connected thereto to transmit force from the power cylinder to said piston, said piston having a transverse slot in the rear portion thereof, a member arranged to hold said ball check valve open in retracted position of said piston, said member lying in the slot in said piston and having a portion extending through said passage to contact said ball check valve and also having rearwardly extending forks straddling said pressure transmitting rod, said member being axially movable with respect to said piston and said ball check valve in seated position, spring means urging said piston to released position, and stop means acting through said member to hold said ball check valve off its seat while said piston is in retracted position.

3. In a booster unit for a hydraulic pressure system including a power cylinder and a hydraulic cylinder associated therewith, a piston reciprocable in said hydraulic cylinder having a longitudinal passage therethrough and a frusto-conical valve seat provided at the forward end of said passage, a ball check valve disposed at the front of the piston yieldably urged to seat on the confluence of said passage and said frusto-conical valve seat to control said passage, a pressure transmitting rod concentric with the piston and connected thereto to transmit force from the power cylinder to said piston, said piston having a transverse slot in the rear portion thereof, a member arranged to hold said ball check valve open in retracted position of said piston, said member lying in the slot in said piston and having a portion extending through said passage to contact said ball check valve and also having rearwardly extending forks straddling said pressure transmitting rod, said member being axially movable with respect to said piston and said ball check valve in seated position, spring means urging said piston to released position, and stop means acting through said member to hold said ball check valve off its seat while said piston is in retracted position.

4. A booster unit for a hydraulic brake system comprising a power cylinder having a casing and a pressure responsive member movable therein under the influence of a differential air pressure, an auxiliary master cylinder disposed at the front of said power cylinder, a pair of oppositely reciprocable pistons carried in said auxiliary master cylinder, a pressure transmitting rod connected to said pressure responsive member in said power cylinder and arranged to pass through an axial opening in one of said pistons to engage the other thereof, a lever pivotally mounted on the inside of said power cylinder casing and engaging the rear of said one of said pistons, valve means disposed at the front of said power cylinder but offset laterally from said auxiliary master cylinder, said valve means being arranged to control operation of said power cylinder, a connection between said lever and said valve means which enables said lever to operate said valve means and which is adjustable to vary the distance between the valve means and the part of the lever which operates the valve means, and a reaction diaphragm associated with said valve means and connected to said lever to exert a force on said lever proportional to the force developed in the power cylinder, said lever being urged in one direction by said one of said pistons in the hydraulic cylinder and in the opposite direction by said reaction diaphragm.

EARL R. PRICE.

REFERENCES CITED

The following references are of record in the file of this patent:

UNITED STATES PATENTS

| Number | Name | Date |
| --- | --- | --- |
| 2,223,424 | Main | Dec. 3, 1940 |
| 2,246,140 | Main | June 17, 1941 |
| 2,260,490 | Stelzer | Oct. 28, 1941 |
| 2,308,460 | Stelzer | Jan. 12, 1943 |
| 2,374,545 | Ingres | Apr. 24, 1945 |
| 2,381,989 | Stelzer | Aug. 14, 1945 |
| 2,406,328 | Gunderson | Aug. 27, 1946 |
| 2,440,654 | Elliott | Apr. 27, 1948 |